United States Patent [19]

Narutani et al.

[11] Patent Number: 5,698,145
[45] Date of Patent: Dec. 16, 1997

[54] METHOD FOR PRODUCING MN-ZN FERRITES

[75] Inventors: Tetsu Narutani; Masakatsu Yamazaki; Keizou Okuno; Katsunobu Okutani, all of Chiba; Kouzou Fujiwara, Tokyo, all of Japan

[73] Assignee: Kawasaki Steel Corporation, Japan

[21] Appl. No.: 230,878

[22] Filed: Apr. 20, 1994

Related U.S. Application Data

[63] Continuation of Ser. No. 786,190, Oct. 31, 1991, abandoned.

[30] Foreign Application Priority Data

Nov. 15, 1990 [JP] Japan .............. HEI 2-307176

[51] Int. Cl.⁶ .......................... C04B 35/26; C04B 35/38
[52] U.S. Cl. ........................ 264/63; 264/65; 264/66
[58] Field of Search ........................... 264/66, 63, 65

[56] References Cited

U.S. PATENT DOCUMENTS

| | | | |
|---|---|---|---|
| 4,093,688 | 6/1978 | Withop | 264/66 |
| 4,097,392 | 6/1978 | Goldman et al. | 252/62.62 |
| 4,247,500 | 1/1981 | Dixon et al. | 264/63 |
| 4,350,651 | 9/1982 | Movell | 264/66 |

FOREIGN PATENT DOCUMENTS

| | | |
|---|---|---|
| 0182406 | 5/1986 | European Pat. Off. . |
| 0337897 | 10/1989 | European Pat. Off. . |
| 0426991 | 5/1991 | European Pat. Off. . |
| 2411813 | 7/1979 | France . |
| 221187 | 1/1990 | Japan . |
| 2-211187 | 1/1990 | Japan . |

OTHER PUBLICATIONS

"Soft Ferrites" Sadatoro Hiraga, Bulletin of the Japan Institute of Metals, vol. 24, No. 4 (1985) (Partial Translation).

"Fast Sintering of Soft Mn–Zn and Ni–Zn Ferrite Pot Cores", Antoinette Morell et al, American Ceramic Society Bulletin, vol. 59, No. 6, 1980, Columbus, Ohio, pp. 62662–62629.

"Soft Ferrites" by Sadataro Hiraga, Bulletin of the Japan Institute of Metals, vol. 24, No. 4 (1985) p. 288 (partial translation and copy of the Japanese reference indicating the translated part).

*Primary Examiner*—James Derrington
*Attorney, Agent, or Firm*—Austin R. Miller

[57] ABSTRACT

A method for sintering Mn—Zn ferrite green compacts is provided which includes a first heating step of raising the temperature from room temperature to 600° C. within a period from 30 minutes to 5 hours, a second heating step of raising the temperature from 600° C. to the sintering temperature and holding the sintering temperature until the start of cooling within a period shorter than 10 hours, and a cooling step of lowering the temperature to 150° C. within a period longer than 3 hours, with the total period of the three steps being shorter than 20 hours. This method permits the efficient production in a short time of Mn—Zn ferrites having good magnetic properties.

5 Claims, 3 Drawing Sheets

METHOD FOR PRODUCING MN-ZN FERRITES

This application is a continuation of application Ser. No. 07/786,190 filed Oct. 31, 1991, now abandoned.

BACKGROUND OF THE INVENTION

1. Field of the Invention

The present invention relates to a method for sintering Mn—Zn ferrites which are used as a soft magnetic material for high-frequency components of communication equipment and household appliances.

2. Description of the Prior Art

There is a notable difference between Ni—Zn ferrites and Mn—Zn ferrites in their production method. The production of former involves the sintering in the air, whereas the production of the latter needs a subtle control over the sintering atmosphere so as to establish an adequate relationship between the temperature and the oxygen content. This control is necessary to impart good magnetic properties to Mn—Zn ferrites. To this end, it is common practice to sinter Mn—Zn ferrites in a batch-type sintering furnace or pusher-type tunnel furnace which is capable of atmosphere control.

The former is operated by repeating the loading of green compacts and unloading of sintered products in each programmed cycle of sintering. This batchwise operation is not efficient for mass production. The operation of the latter involves the intermittent supply of green compacts held in a refractory tray and the intermittent discharging of sintered products. The trays are pushed one after another into and out of the furnace by means of a mechanical or hydraulic pusher. This method is industrially applied to the production of Mn—Zn ferrites. According to this method, the transfer of green compacts in the furnace is by the trays which are moved forward on the passage as the preceding one is pushed by the following one. Since the sintering of Mn—Zn ferrites is performed at a temperature as high as 1300° C., the tray needs sufficient mechanical strength. Therefore, it is made of tough refractory material and weighs as much as or more than the green compacts it holds. Such a heavy tray has a large heat capacity which leads to an uneven temperature distribution among the green compacts it holds during sintering. (In other words, a temperature difference arises in and between green compacts depending on the position where they are placed on the tray and whether or not they are in contact with the tray during heating and cooling.) This results in variation in magnetic properties of finished products or cracking of products in the case where the temperature difference exceeds a critical value. Gradual heating and cooling are required to avoid these troubles.

Conventionally, the sintering of Mn—Zn ferrites needs more than 20 hours, usually 25 to 40 hours, including the preheating step to remove the binder from the green compacts. (Some kinds of organic substances are used as binders which are added in a small quantity to green compacts to increase their density and strength.) For the production of Mn—Zn ferrites with good magnetic properties, it is essential to perform sintering while accurately controlling the heating and cooling rate and the amount of oxygen in the atmosphere in each stage of heating, holding, and cooling. (See "Soft Ferrites" by Sadataro Hiraga, Bulletin of the Japan Institute of Metals, vol. 24, No. 4 (1985), p. 288.)

The long sintering time has been considered to be unavoidable for Mn—Zn ferrites in order to get around difficulties arising from the furnace itself. Another reason for the long sintering time resides in the complexity in formation of Mn—Zn ferrites. As mentioned in the above-cited article, it is necessary to control the atmosphere during heating in consideration of decomposition, reaction, and formation of each phase which constitutes green compacts. In addition, great care should be exercised to control the crystal growth rate, the segregation of trace elements at grain boundaries and the amount of $Fe^{2+}$.

It is possible to control the atmosphere by employing the combustion type continuous sintering tunnel furnace as disclosed in Japanese Patent Laid-open No. 21187/1990. This furnace is provided with a section of low oxygen partial pressure in the cooling zone. This furnace is designed to sinter soft ferrites, but it is necessarily easy to get Mn—Zn ferrites with good magnetic properties efficiently in a short time.

For the production of Mn—Zn ferrites with good magnetic properties, it has been essential to perform sintering for a long time under strictly controlled the temperature and atmospheric conditions. This is due partly to the above-mentioned limitations imposed by the pusher type tunnel furnace and partly to the necessity of accurately controlling the crystal structure and the amount of $Fe^{2+}$ in the ferrites.

SUMMARY OF TEE INVENTION

In view of the foregoing, the present inventors carried out a series of research to produce Mn—Zn ferrites with good magnetic properties by sintering in a short time less than 20 hours. It was found that the object is achieved by a new sintering method which involves the strict sintering pattern control in the heating and cooling stages.

It is an object of the present invention to provide a method for sintering Mn—Zn ferrites efficiently in a short time.

The present invention is embodied in a method for sintering Mn—Zn ferrite green compacts which comprises a first heating step of raising the temperature from room temperature to 600° C. within a period from 30 minutes to 5 hours, a second heating step of raising the temperature from 600° C. to the sintering temperature and holding the sintering temperature until the start of cooling within a period shorter than 10 hours, and a cooling step of lowering the temperature to 150° C. within a period longer than 3 hours, with the total period of the three steps being shorter than 20 hours.

The method of the present invention permits the mass production of Mn—Zn ferrites with good magnetic properties in a short time less than 20 hours contrary to common practices due to the strict control over the heat pattern throughout the entire process of sintering from heating to cooling.

The Mn—Zn ferrites to which the method of the present invention may be applied include those ferrites which are composed mainly of $Fe_2O_3$, MnO, and ZnO. They may contain additional constituents such as NiO, MgO, and CuO for the improvement of characteristic properties. They may also contain trace elements derived from $SiO_2$, CaO, $V_2O_5$, $TiO_2$, $Nb_2O_5$, and others.

DESCRIPTION OF THE PREFERRED EMBODIMENTS

The method of the present invention can be applied to sintering by any kind of furnace so long as it permits sintering under the conditions specified in this invention. A recommended one is the roller hearth type continuous sintering furnace provided with a section of low oxygen partial pressure in the cooling zone (which was proposed by the present inventors in Japanese Patent Laid-open No. 21187/1990).

The roller hearth type continuous furnace is provided with a large number of refractory rolls arranged at certain intervals in the longitudinal direction of the furnace. The trays holding green compacts are moved forward as the rolls rotate. Therefore, the trays are not required to be as strong as those which are used for the pusher type tunnel furnace. In other words, very light thin trays will suffice. Such trays contribute to the uniform temperature distribution in and among green compacts to be sintered, which can result in products having uniform dimensions and good magnetic properties.

Heating the furnace may be conducted by electricity as in the case of conventional pusher type tunnel furnaces. Electrical heating may be partly replaced by gas heating, except in that section of the furnace where it is necessary to strictly control the amount of oxygen in the atmosphere. (This section ranges from the part where the sintering temperature reaches the maximum to the cooling zone.) Gas heating is not only economical but also advantageous to uniform heating due to a large amount of hot combustion gas passing through space between green compacts.

According to the method of the present invention, the sintering of Mn—Zn ferrite green compacts can be accomplished within a short time less than 20 hours. In order to realize short-time sintering, heating from room temperature to 600° C. should be accomplished within a period from 30 minutes to 5 hours. This preheating is intended to remove binders (such as PVA) and lubricants (such as zinc stearate) from green compacts by reaction with the atmospheric gas.

Figure 1:
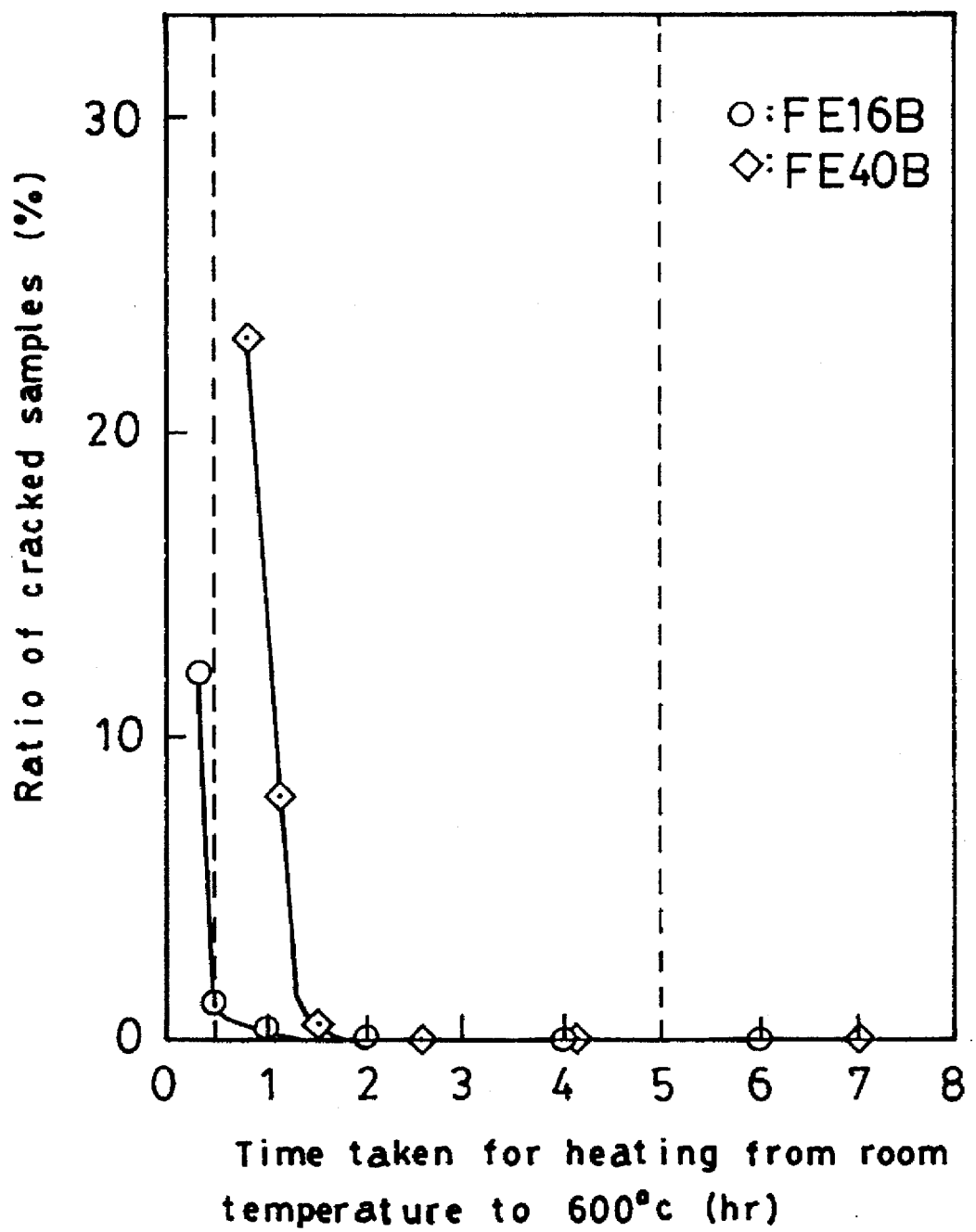
FIG. 1 is a graph showing the relationship between the time taken for heating from room temperature to 600° C. and the ratio (in %) of cracked samples.

To see the effect of preheating from room temperature to 600° C., samples of green compacts (comparatively small cores FE16B and comparatively large cores FE40B, both conforming to JIS specifications) were heated from room temperature to 600° C. over a different period from 20 minutes to 7 hours. After the preheating, they were heated to 1300° C. over a period of 2 hours, held at this temperature for 1 hour, and cooled to 150° C. over a period of 6 hours in an atmosphere with a controlled oxygen concentration. After sintering, the sintered compacts were checked for cracking, and the number (in %) of cracked compacts was plotted against the length of the preheating period. The results are shown in FIG. 1. It is noted from FIG. 1 that the ratio of cracking can be reduced below 1% if the period for preheating (from room temperature to 600° C.) is longer than 30 minutes (in the case of FE16B) or longer than 1.5 hours (in the case of FE40B).

It is considered that rapid preheating brings about cracking due to a great temperature difference in green compacts and an abrupt reaction of the binder. Prolonged preheating is not detrimental but is uneconomical. Therefore, the method of the present invention requires that the period of preheating from room temperature to 600° C. should be from 30 minutes to 5 hours.

The preheating under the above-mentioned conditions is enough to remove the binder completely. After the preheating, the temperature is raised to the maximum sintering temperature, which ranges from 1150° C. to 1400° C. depending on the material of the green compacts to be sintered. If necessary, the maximum sintering temperature is kept for a certain period of time. In order to accomplish sintering within 20 hours, it is important to reduce the period of time from the end of preheating (at 600° C.) to the start of cooling. This period should be less than 10 hours, according to the method of the present invention. (This length of period was established in view of the preheating time and the limited cooling time mentioned later.) There are no restrictions on the heat pattern employed for sintering which starts from 600° C., reaching the maximum sintering temperature and holding at the temperature, and goes down to the cooling temperature. The heat pattern depends on the material of green compacts to be sintered. Heating from 600° C. to 1100° C. for initial sintering should preferably be slow so that trace elements added to the ferrite concentrate can accumulate completely at the grain boundaries. By contrast, heating above 1100° C. should be performed rapidly at a rate greater than 350° C./h. It is not always necessary to hold the maximum sintering temperature in the case of sintering by a roller hearth type continuous sintering furnace, because the compacts are uniformly heated when the maximum sintering temperature is reached. The period in which the maximum sintering temperature is kept should be as short as possible within a limit necessary to maintain a certain density, so as to minimize the diffusion of concentrated trace elements at grain boundaries into grains and to make trace elements most effective.

Sintering up to the above-mentioned stage should be performed in an inert gas atmosphere (preferably nitrogen) containing 21–0.1% oxygen.

Cooling should be performed slowly over a period longer than 3 hours until the temperature goes down to 150° C. Rapid cooling results in uneven temperature distribution, which leads to deteriorated and unstable magnetic properties through the generation of residual stress and distortion in the products.

After cooling to 150° C., the sintered cores are allowed to cool to room temperature in the air without any adverse effect on the characteristic properties.

Figure 2:
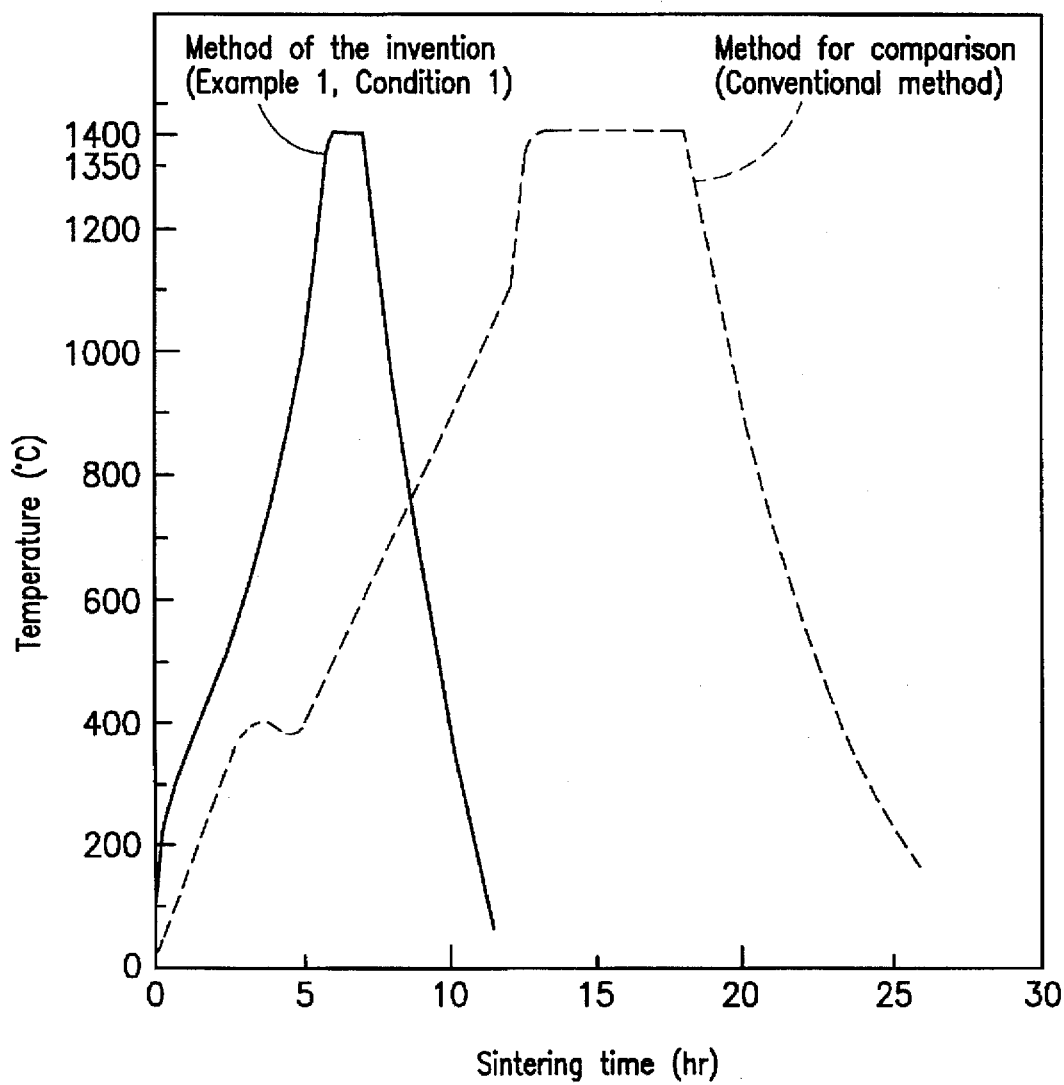
FIG. 2 is a graph showing the sintering heat patterns employed in the conventional method and the method of the present invention.

The heat pattern employed in the method of the present invention is shown in FIG. 2 together with that employed in the conventional method. It is noted from FIG. 2 that the method of the present invention permits the sintering of Mn—Zn ferrites in a shorter time than the conventional method.

EXAMPLES

Example 1

A raw material mixture composed of 52.6 mol % $Fe_2O_3$, 35.4 mol % MnO, and 12.0 mol % ZnO was calcined at 950° C., and the calcined product was pulverized, together with $SiO_2$ (85 ppm), $CaCO_3$ (650 ppm), $Nb_2O_5$ (170 ppm), and $TiO_2$ (2500 ppm) as trace elements, by a wet ball mill into a powder having an average particle diameter of 1.1 μm. This powder was granulated by incorporation with PVA as a binder, and the granules were compacted into rings whose dimension was 36 mm in outer diameter, 24 mm in inner diameter, and 12 mm in height.

The green compacts were sintered using a roller hearth type continuous sintering furnace under the following two conditions.

Condition 1. Heating from room temperature to 600° C. over 3 hours, heating from 600° C. to 1350° C. over 3 hours, holding at 1350° C. for 1 hour, and cooling down to 150° C. over 5 hours, with total sintering time being 12 hours.

Condition 2. Heating from room temperature to 600° C. over 40 minutes, heating from 600° C. to 1350° C. over 1.5 hours, holding at 1350° C. for 40 minutes, and cooling down to 150° C. over 4 hours, with the total sintering time being 6 hours 50 minutes.

For comparison, sintering was performed according to the following heat pattern using a pusher type tunnel furnace equipped with a separate furnace for binder removal. Beating from room temperature to 600° C. over 7 hours, heating from 600° C. to 1350° C. over 6 hours, holding at 1350° C. for 5 hours, and cooling down to 150° C. over 8 hours, with the total sintering time being 25 hours. The heat patterns are shown in FIG. 2.

The sintered cores obtained were tested for power loss using an ac BE tracer at 100 kHz, 0.2 T (maximum magnetic flux density), and 85° C. The results are as follows:

| Condition 1 | Condition 2 | Comparison |
| --- | --- | --- |
| 305 mW/cm³ | 365 mW/cm³ | 359 mW/cm³ |

It is noted that the method of the present invention permits efficient sintering in a short time to give Mn—Zn ferrites having good magnetic properties comparable to those produced by the conventional method.

Example 2

A raw material mixture composed of 53.0 mol % $Fe_2O_3$, 26.5 mol % MnO, and 20.5 mol % ZnO was calcined at 880° C., and the calcined product was pulverized, together with $SiO_2$ (100 ppm), $CaCO_3$ (1000 ppm), and $V_2O_5$ (200 ppm) as trace elements, by a wet ball mill into a powder having an average particle diameter of 1.0 µm. This powder was granulated by incorporation with PVA as a binder, and the granules were compacted into rings whose dimension was 36 mm in outer diameter, 24 mm in inner diameter, and 12 mm in height.

The green compacts were sintered using a roller hearth type continuous sintering furnace under the following condition. Heating from room temperature to 600° C. over 2 hours, heating from 600° C. to 1370° C. over 2 hours, holding at 1370° C. for 40 minutes, and cooling down to 150° C. over 4 hours.

For comparison, sintering was performed using a pusher type tunnel furnace under the same condition as used in the comparative experiment in Example 1, except that the holding temperature was changed to 1370° C.

Figure 3:
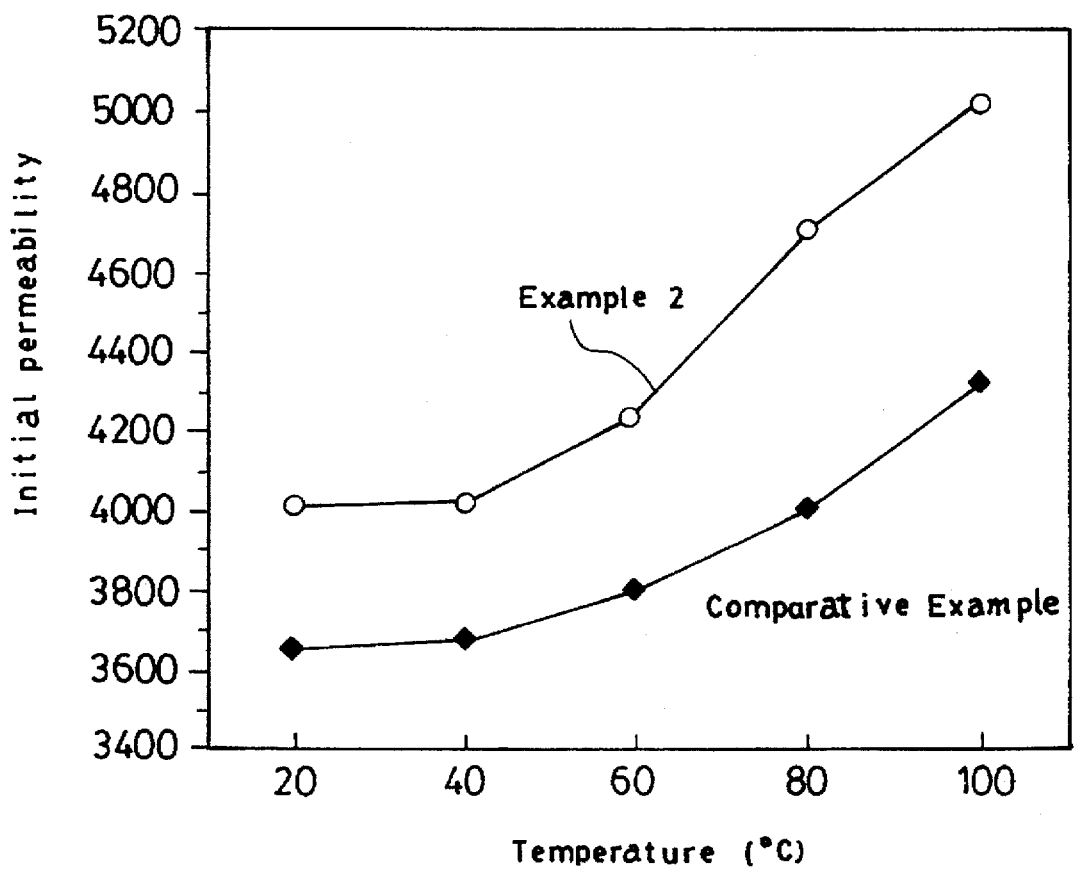
FIG. 3 is a graph showing the dependence on temperature of the initial permeability of the Mn—Zn ferrites obtained in Examples and Comparative Examples.

The sintered cores obtained were tested for initial permeability (at 100 kHz) at different temperatures. The results are shown in FIG. 3. It is noted from FIG. 3 that the sample pertaining to the present invention has an initial permeability of 4000 at room temperature, whereas that of the comparative sample is 3600.

What is claimed is:

1. A method of sintering a Mn—Zn ferrite green compact in a roller hearth continuous sintering furnace comprising:
   a) preparing a calcined mixture of $Fe_2O_3$, MnO and ZnO,
   b) combining said calcined mixture with a binder consisting essentially of polyvinyl alcohol to form a metal oxide/binder mixture,
   c) compacting said metal oxide/binder mixture to form said Mn—Zn ferrite green compact,
   d) removing said binder from said compact by reaction with atmospheric gas while preheating said compact by raising the temperature from room temperature to 600° C. within a period from 30 minutes to 5 hours,
   e) heating said compact in an inert gas atmosphere containing 0.1–21% oxygen by slowly raising the temperature from 600° C. to 1100° C. as an initial sintering temperature to permit concentration and accumulation of trace elements, when present, at said grain boundaries within said compact and followed by rapidly raising the temperature at a rate greater than 350° C./h to a higher sintering temperature of 1150°–1400° C. to minimize diffusion of concentrated and accumulated trace elements away from said grain boundaries,
   f) maintaining said compact at said initial and higher sintering temperatures for a period shorter than 10 hours, and
   g) producing a ferrite having low power loss and high permeability by cooling said compact to a temperature of 150° C. within a period longer than 3 hours,
   with a total period of said preheating, heating and cooling steps being shorter than 20 hours.

2. The method defined in claim 1 wherein the preheating and heating steps are conducted in a roller hearth continuous furnace.

3. The method defined in claim 1 further comprising adding trace elements selected from the group consisting of $SiO_2$, $CaCO_3$, $V_2O_5$, $Nb_2O_5$ and $TiO_2$ into said mixture.

4. In a method of sintering a Mn—Zn ferrite green compact in a roller hearth continuous sintering furnace, the steps which comprise: preparing a calcined mixture of 52.6–53.0 mol % $Fe_2O_3$, 26.5–35.4 mol % MnO and 12.0–20.5 mol % ZnO, combining said calcined mixture with a binder consisting essentially of polyvinyl alcohol, compacting the resulting mixture into said Mn—Zn ferrite green compact, a heating step of raising the temperature from room temperature to 600° C. within a period from 30 minutes to 5 hours, another heating step of further raising the temperature from 600° C. to a sintering temperature, holding the sintering temperature for a period shorter than 10 hours, and a cooling step of lowering the temperature to 150° C. within a period longer than 3 hours, with a total period of said heating and cooling steps being shorter than 20 hours.

5. A method of sintering a Mn—Zn ferrite green compact in a roller hearth continuous sintering furnace comprising:
   a) preparing a calcined mixture of 52.6–53.0 mol % $Fe_2O_3$, 26.5–35.4 mol % MnO and 12.0–20.5 mol % ZnO,
   b) combining said calcined mixture with a polyvinyl alcohol binder to form a metal oxide/binder mixture,
   c) compacting said metal oxide/binder mixture to form said Mn—Zn ferrite green compact,
   d) removing said binder from said compact by reaction with atmospheric gas while preheating said compact by raising the temperature from room temperature to 600° C. within a period from 30 minutes to 5 hours,
   e) heating said compact by raising the temperature from 600° C. to 1100° C. as an initial sintering temperature to permit trace elements, when present to concentrate and accumulate at grain boundaries within said compact and followed by raising the temperature at greater than 350° C./h to a higher sintering temperature to minimize diffusion of concentrated and accumulated trace elements away from said grain boundaries,
   f) holding the initial and higher sintering temperatures for a period shorter than 10 hours, and
   g) cooling said compact by lowering the temperature to 150° C. within a period longer than 3 hours,
   with a total period of said preheating, heating and cooling steps being shorter than 20 hours.

* * * * *

UNITED STATES PATENT AND TRADEMARK OFFICE
CERTIFICATE OF CORRECTION

PATENT NO. : 5,698,145
DATED : 12/16/97
INVENTOR(S) : Tetsu Narutani, Masakatsu Yamazaki, Keizou Okuno, Katsunobu Okutani, and Konzou Fujiwara It is certified that error appears in the above-indentified patent and that said Letters Patent is hereby corrected as shown below:

On the title page: under Item [56]

In the "OTHER PUBLICATIONS", line 1, please change "Sadatoro" to --Sadataro--.

Column 5, line 10, please change "Beat-ing" to --Heat-ing--; and line 17, please change "BE tracer" to --BH tracer--.

Signed and Sealed this

Fifteenth Day of September, 1998

*Attest:*

BRUCE LEHMAN

*Attesting Officer*                *Commissioner of Patents and Trademarks*